United States Patent [19]

Kobayasi et al.

[11] 4,376,337

[45] Mar. 15, 1983

[54] METHOD OF MANUFACTURING MAGNETIC TRANSDUCER HEAD

[75] Inventors: Tomio Kobayasi, Shiogama; Kouji Fukushi, Tagajo, both of Japan

[73] Assignee: Sony Corporation, Tokyo, Japan

[21] Appl. No.: 304,672

[22] Filed: Sep. 28, 1981

Related U.S. Application Data

[62] Division of Ser. No. 102,645, Dec. 12, 1979, abandoned.

[30] Foreign Application Priority Data

Dec. 19, 1978 [JP] Japan .................................. 53-157138

[51] Int. Cl.³ .............................................. G11B 5/42
[52] U.S. Cl. ..................................... 29/603; 360/121; 360/123; 360/127
[58] Field of Search ................... 29/603; 360/119-123, 360/125-127

[56] References Cited

U.S. PATENT DOCUMENTS 3,344,237  9/1967  Gregg .
4,127,884  11/1978  Nouchi et al. .
4,158,213   6/1979  Griffith .

Primary Examiner—Carl E. Hall
Attorney, Agent, or Firm—Hill, Van Santen, Steadman, Chiara & Simpson

[57] ABSTRACT

A multi-channel magnetic transducer head is formed by combining two core blocks with a magnetic gap therebetween. On the confronting surface of one of two core blocks, there is provided a plurality of parallel grooves. On the confronting surface of another core block, there is provided a gap defining a groove extending perpendicular to the parallel grooves. A plurality of first conductor strips are formed on the confronting surface of the one core and in the parallel grooves and the strips extend in the direction substantially perpendicular to the parallel grooves. Another surface of the one core opposite to the confronting surface is ground until the conductor strips are disposed on the surface and the cores are separated into a plurality of core elements. Second conductor strips are formed on the opposite surface to form coils around the core elements in cooperation with the first conductor strips.

3 Claims, 30 Drawing Figures

FIG. 5   FIG. 4   FIG. 7
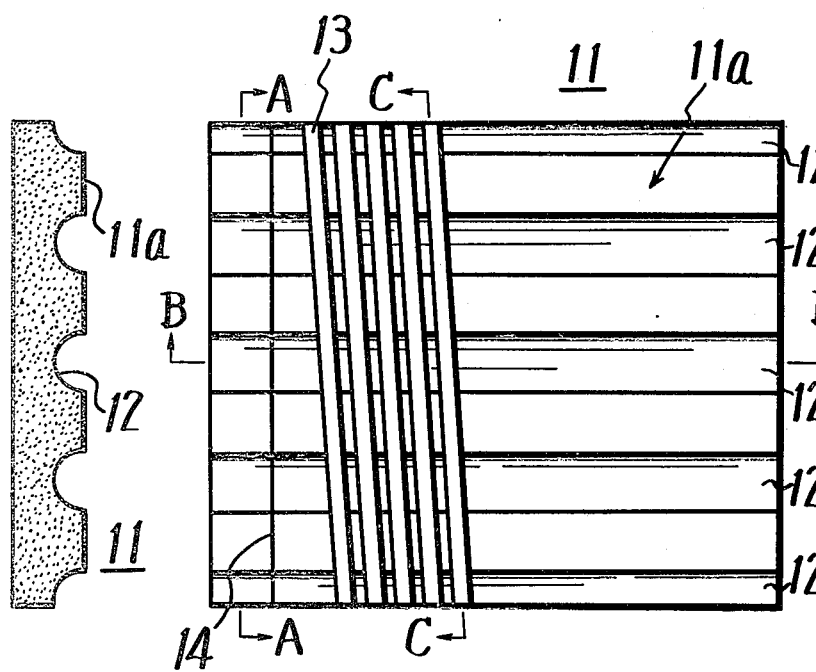
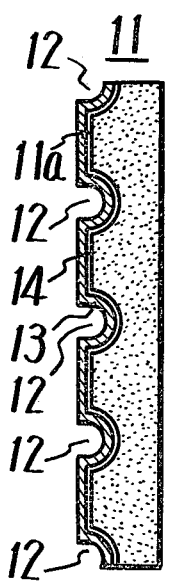
FIG. 6
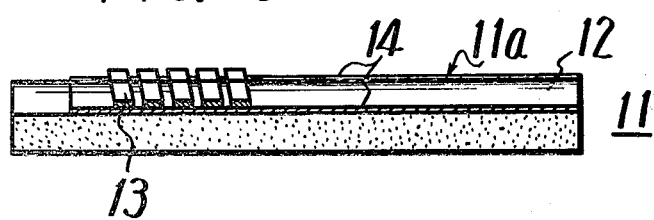

FIG. 9     FIG. 8     FIG. 11
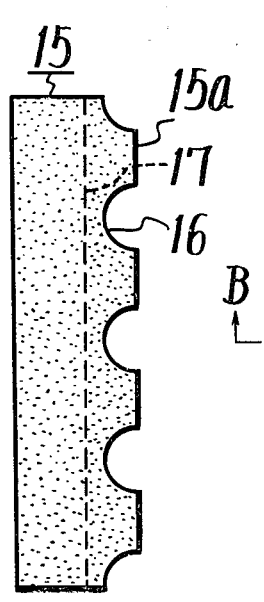
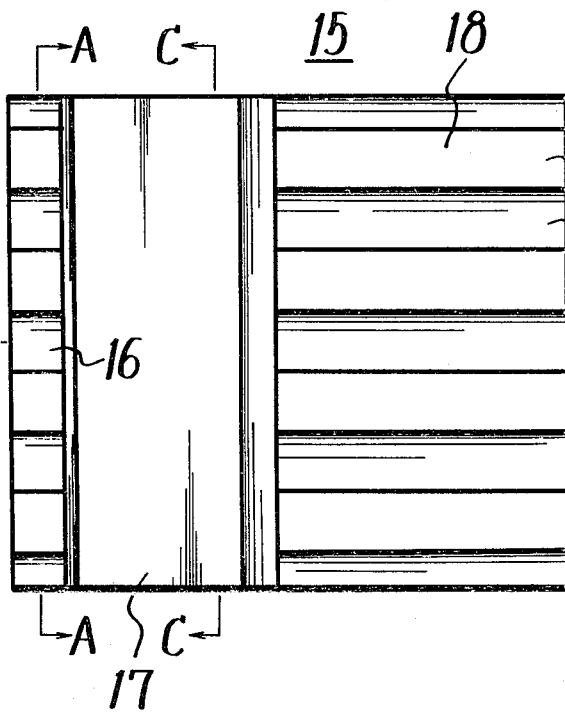
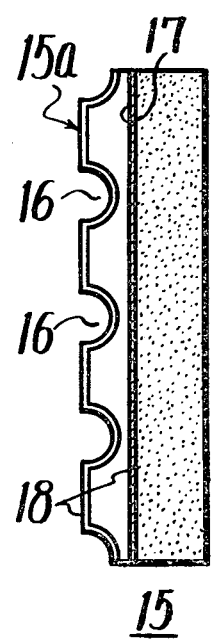
FIG. 10
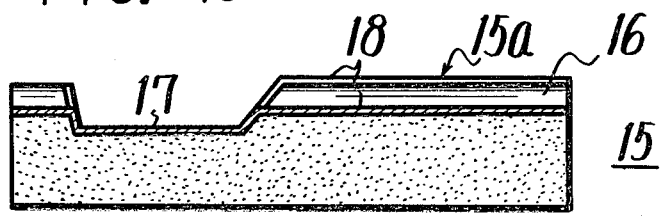

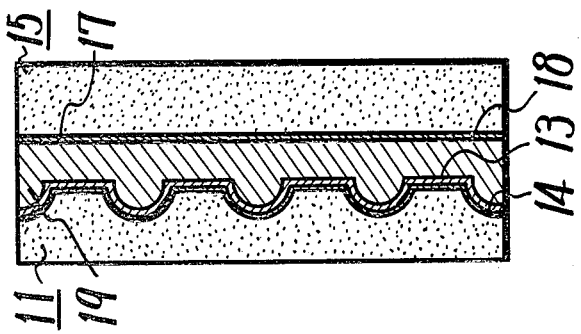
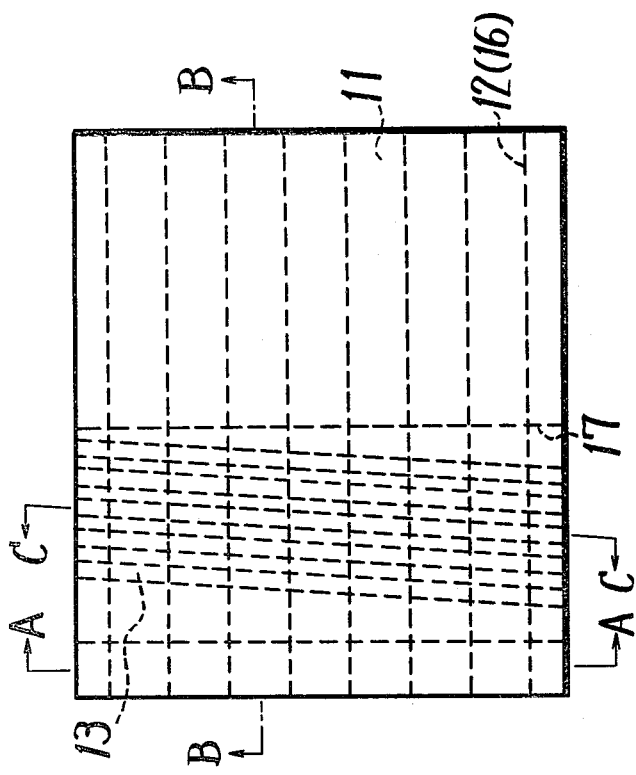
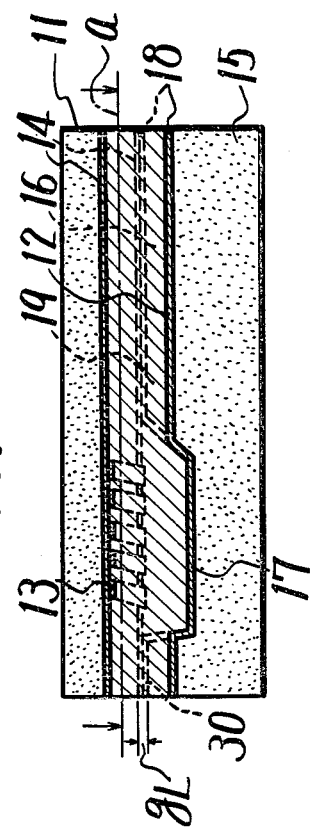
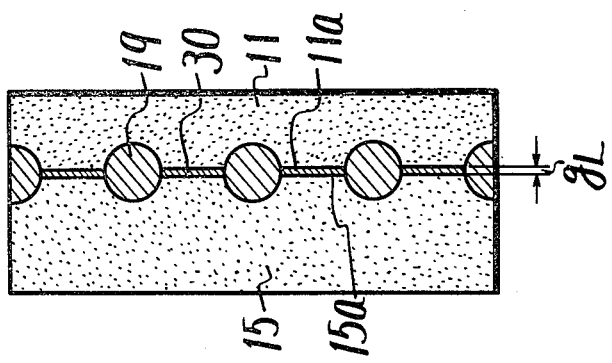

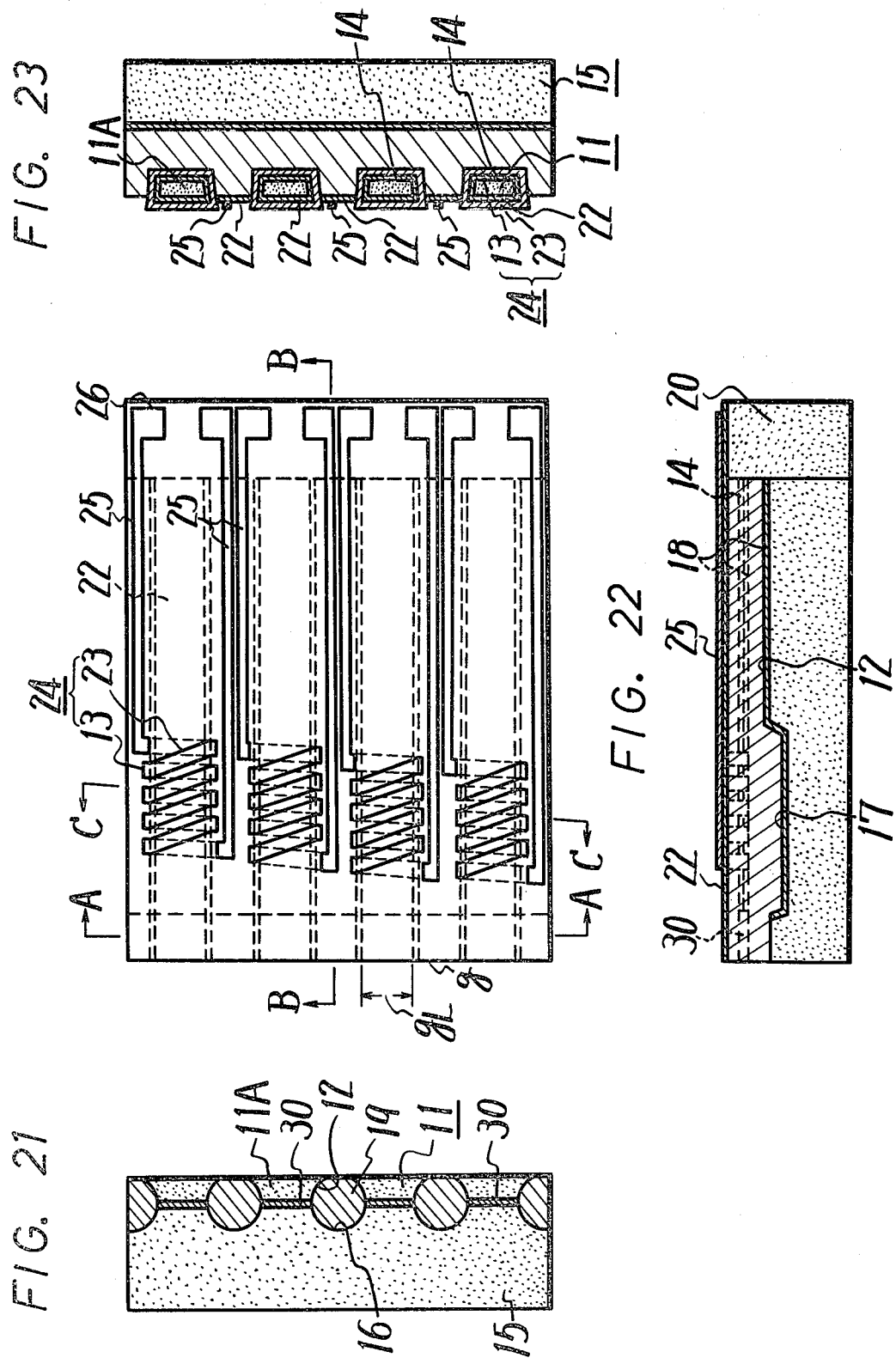

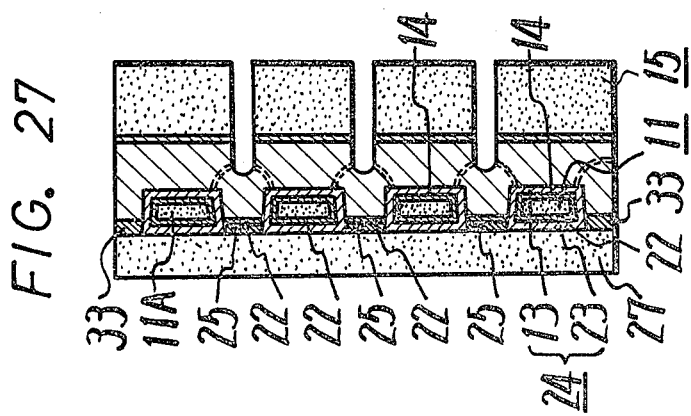
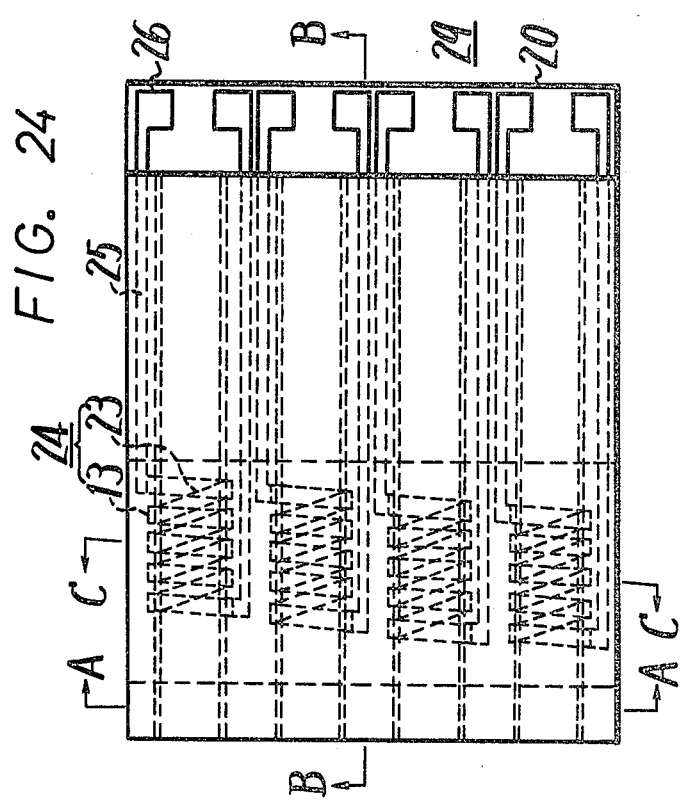
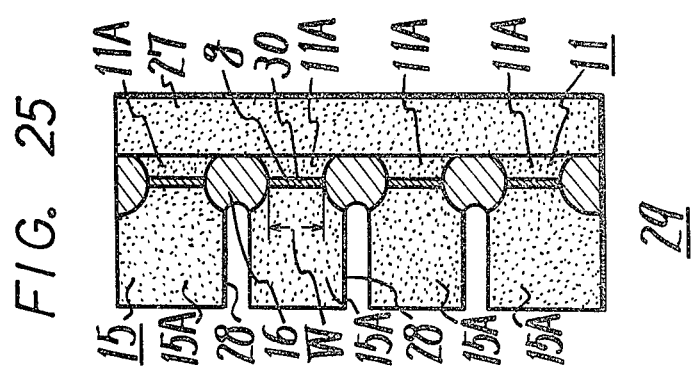
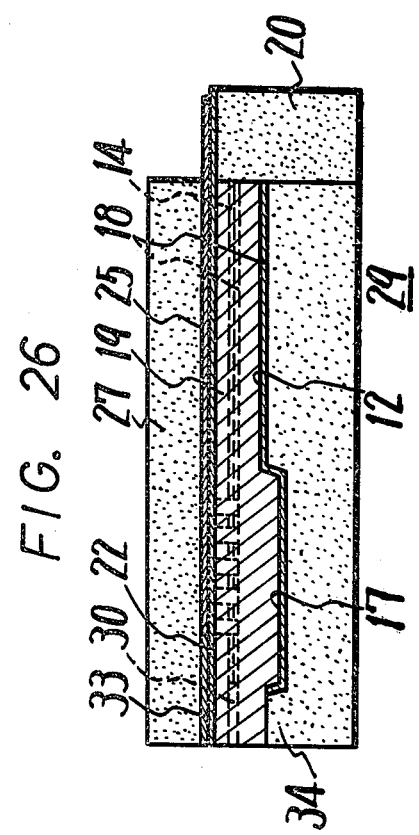

METHOD OF MANUFACTURING MAGNETIC TRANSDUCER HEAD

This is a division, of application Ser. No. 102,645, filed Dec. 12, 1979 now abandoned.

BACKGROUND OF THE INVENTION

1. Field of the Invention

The present invention relates generally to a magnetic transducer head and is directed more particularly to a magnetic transducer head suitable as a multi-channel magnetic transducer head and to the method for manufacturing the head.

2. Description of the Prior Art

In the art, a multi-channel magnetic head, which is used for high density digital magnetic recording or the like, is constructed such that the magnetic gap for each track i.e. each channel are arranged very close to each other. FIG. 1 illustrates an example of the prior art multi-channel magnetic head. In the prior art example of FIG. 1, a respective pair of core halves 1 and 2 of each magnetic core are abutted to form a magnetic gap g therebetween and each of the thus formed magnetic head elements is secured to a non-magnetic body 3 with a desired distance between adjacent head elements. At least one of the core halves 1 and 2 determines the depth of the magnetic gap g and is formed with a groove 5 on which a winding 4 is wound. Since the multi-channel magnetic head of the above construction requires a space in each of the magnetic head elements for winding the wire which forms the winding 4, and it becomes difficult if the distance between adjacent tracks of the respective channels i.e. the distance between adjacent magnetic head elements is selected to be smaller than 100 μm. Accordingly, in the above prior art multi-channel magnetic head it is not possible for the distance between the adjacent tracks to be made sufficiently small and hence it is impossible to construct a high density head.

In order to avoid the above defect, there has been proposed a magnetic head in which, as shown in FIG. 2, a first magnetic thin film 6 is formed on a substrate (not shown) by a thin film technique. A conductive thin film 7 is then formed on the film 6 across the film 6 by the thin film technique, and a second thin magnetic film 8 is formed on the film 7 so as to overlap the first thin magnetic film 6 to thereby form a magnetic gap g between the front ends of the first and second thin magnetic films 6 and 8. In this case, however, the winding made of the conductive thin film 7 has only one turn, so that sufficiently large reproduced output is not obtained. Therefore, the one turn thin film magnetic head shown in FIG. 2 although used as a recording magnetic head, but cannot be used as a reproducing magnetic head unless a magneto-resistance effect element or hall effect element is provided by, for example, the thin film technique, which complicates the construction.

Further, there is also proposed a thin film magnetic head in which, as shown in FIG. 3, a first conductive thin film 7A is formed under the first magnetic thin film 6 and a second conductive thin film 7B is formed on the first magnetic film 6 so as to continue and contact the first conductive film 7A, whereby both the films 7A and 7B form a plurality of windings, and a second magnetic thin film 8 is formed on the film 7B to form a magnetic gap g with the first magnetic film 6. The magnetic head shown in FIG. 3 has a defect such that the magnetic films 6 and 8 have lengths which are long and the magnetic reluctance of the magnetic path is high due to the fact that the films 6 and 8 are thin, and generally about 2 to 10 μm in thickness to reduce eddy current loss and the reproduction efficiency is lowered. To avoid this defect, an attempt has been made to form the magnetic films 6 and 8 of magnetic ferrite with large resistivity to avoid the eddy current loss and to increase the thickness of the films 6 and 8. In this case, since the speed of growth of the film by the sputtering of magnetic ferrite is at very low speed such as several hundreds of Å per minute, it is difficult to produce. Further, even if the magnetic film is made thick as mentioned above, as the thickness of the magnetic films increases, the accuracy of the magnetic gap g becomes a problem.

OBJECTS AND SUMMARY OF THE INVENTION

It is an object of the present invention to provide an improved magnetic transducer head.

It is another object of the present invention to provide a multi-channel magnetic transducer head having high density integration.

It is a further object of the present invention to provide a multi-channel magnetic transducer head, in which magnetic gaps of each head elements are aligned in one line.

It is a still further object of the present invention to provide a method of manufacturing a multichannel magnetic transducer head employing a thin film technique.

According to one aspect of the present invention, there is provided a multi-channel magnetic transducer head comprising:
 a first core of magnetic material having a first flat planar surface,
 a plurality of second magnetic cores, each having a second planar surface,
 said first core and a plurality of said second cores being bonded together to form a plurality of operating magnetic gaps between said first flat planar surface and said second planar surfaces, each of said second cores being separated from each other with a predetermined distance therebetween,
 a groove along said magnetic gaps formed at least on one of first and second planar surfaces, defining a depth of the magnetic gaps,
 first conductive layers formed on each of said second cores along the surface of said second cores through said groove, each portion of said first conductive layers being on opposite surface of said second cores to said second planar surfaces, and
 second conductive layers on each of said opposite surfaces of said second cores connecting said end portions to form coils around each of said second cores in cooperation with said first conductive layers.

According to another aspect of the present invention, there is provided a method of manufacturing a magnetic transducer head comprising the steps of;
 (a) preparing first and second magnetic cores, each having a first planar surface and a second planar surface opposite to said first surface,
 (b) forming first parallel grooves in one direction, leaving a predetermined width on said first surface of said first core, (c) forming a second groove extending perpendicular to said one direction on said first surface of at least one of said first and second cores, (d) forming a conductive line on said first surface and in said parallel grooves of said first core extending along a direction substantially perpendicular to said one direction, (e) bonding said first and second cores to form an operating magnetic gap between said first surfaces of said first and second cores and placing said conductive line to meet said second groove, and filling said first and second grooves with non-magnetic material, (f) removing a part of said first core from said second surface so as to dispose portions of said conductive line and to separate said conductive line in said first parallel grooves, and (g) forming second conductive material on said second surface of said first core to connect said portions of said first conductive line disposed on said second surface so as to form a coil around said first core.

The other objects, features and advantages of the present invention will become apparent from the following description taken in conjunction with the accompanying drawings through which the like reference numerals designate the same elements and parts.

BRIEF DESCRIPTION OF THE DRAWINGS

FIGS. 4 to 27 are respectively schematic diagrams used for explaining an example of the methods of making an example of the magnetic head according to the present invention;

DESCRIPTION OF THE PREFERRED EMBODIMENTS

Figure 1:
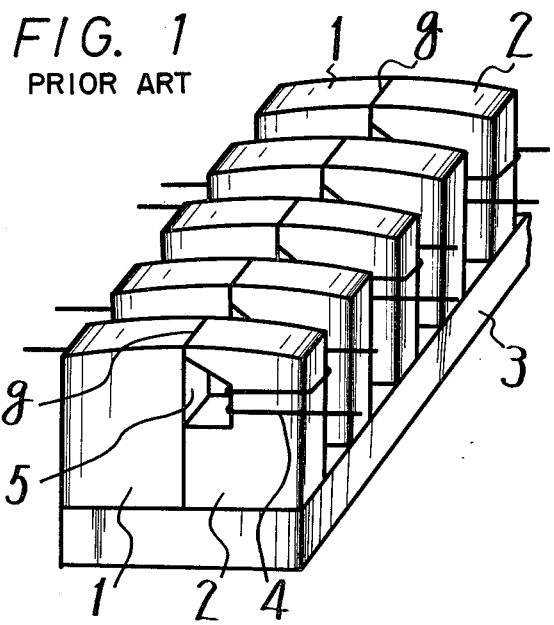
FIGS. 1 to 3 are respectively perspective views showing prior art magnetic heads.
Figure 2:
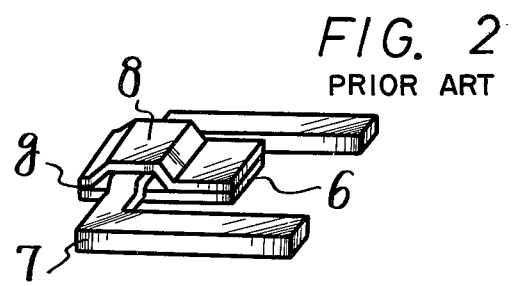
Figure 3:
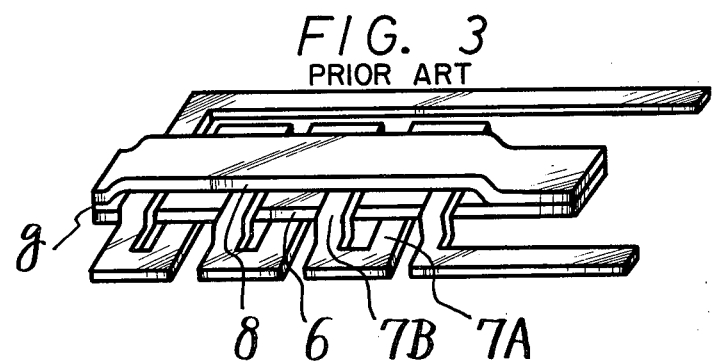

The present invention will be hereinbelow described with reference to the accompanying drawings.

An example of the invention applied to a multi-channel magnetic head will be now described in detail with reference to FIGS. 4 to 27.

As shown in FIG. 4 which is a plan view and FIGS. 5, 6 and 7 which are respectively cross-sectional view on lines A—A, B—B and C—C in FIG. 4, in the invention, a first magnetic block 11 such as a magnetic ferrite block of, for example, a thin plate is prepared and a plurality of gap width restricting grooves 12 are formed on one side surface 11a of the block 11 with a predetermined distance and width between adjacent grooves which will restrict the gap width of a magnetic gap which will be formed. These grooves 12 may be formed by mechanical working, electrolytic-etching or the like. A plurality of first band-shaped conductive layer 13 made of, for example, copper Cu or the like, which will form a part of a winding which is to be formed, are formed substantially parallel to one another on the surface 11a over an insulating layer 14 made of material such as a silicon dioxide $SiO_2$ to intersect each of the grooves 12. The insulating layer 14 may be formed in such a manner by way of example that $SiO_2$ is vapor deposited or sputtered on whole the surface 11a except portions which will finally form the magnetic gaps, and the conductive layer 13 may be formed by such a manner that, for example, Cu is vapor deposited or sputtered on the whole surface 11a and then removed to form a desired pattern by a photo-lithograpic technique.

As shown in FIG. 8 which is a plan view and FIGS. 9, 10 and 11 which are respectively cross-sectional views on lines A—A, B—B and C—C in FIG. 8, a second magnetic block 15 of, for example, a plate shape made of, for example, magnetic ferrite is prepared, and a plurality of magnetic gap width restricting grooves 16, which will correspond to the grooves 12 of the first block 11, are formed on one side surface 15a of the second block 15 by mechanical working, electrolytic etching or the like. A restricting groove 17, which will determine the gap depth of a final magnetic head, is formed on the surface 15a of the block 15 to intersect the respective grooves 16 at, for example, right angles by mechanical working, electrolytic etching or the like. An insulating layer 18 made of, for example, $SiO_2$ or the like is coated on the surface 15a of the block 15 including, for example, the surfaces of the grooves 16 and 17 by vapor deposition, sputtering or the like. In this case, the parts of the insulating layer 18 on the parts of the surface 15a, which will form, for example, final magnetic gaps, are selectively removed by etching or the like.

The first and second blocks 11 and 15 are assembled integrally as shown in FIG. 12 which is a top plan view of the assembled blocks and FIGS. 13, 14 and 15 which are respectively cross-sectional views on line A—A, B—B and C—C in FIG. 12 such that both the surfaces 11a and 15a of the blocks 11 and 15 abut with each other. During assembly, a gap spacer 30, which is made of non-magnetic material and has the thickness of $g_L$ corresponding to the gap length of the magnetic gap is interposed between the surfaces 11a and 15a of the blocks 11 and 15 in the region where a magnetic gap is to be formed. The gap spacer 30 may be formed by a manner such that, for example, $SiO_2$ layer is previously coated on one or both of the surfaces 11a and 15a of the blocks 11 and 15 in a region corresponding to the final magnetic gap by vapor deposition or sputtering. The assembling or bonding of both the blocks 11 and 15 may be achieved by charging and melting a non-magnetic charging material 19 such as glass into, for example, the grooves 12, 16 and 17. The charging of the glass 19 may be carried out in such a manner that a glass rod, for example, is previously inserted into the groove 17 and so on and then melted by heating it. In this case, it is desired that in order to reduce the reaction of the glass 19 with, for example, the Cu layer, which is the material to form the first conductive layer 13 and a second conductive layer described later, powders of $CuO_2$ and Cu are added to the glass 19 and the glass 19 is prepared under a non-oxidizing atmosphere. However, glass may be used which contains other reducing agents.

Figure 19:
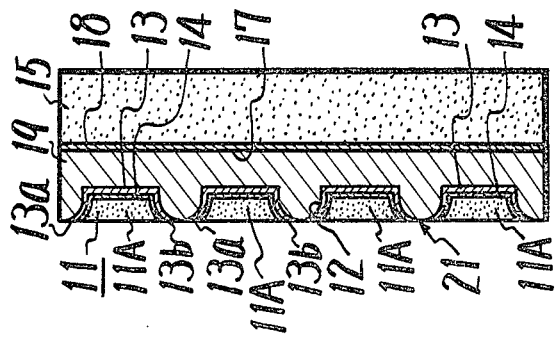
Figure 16:
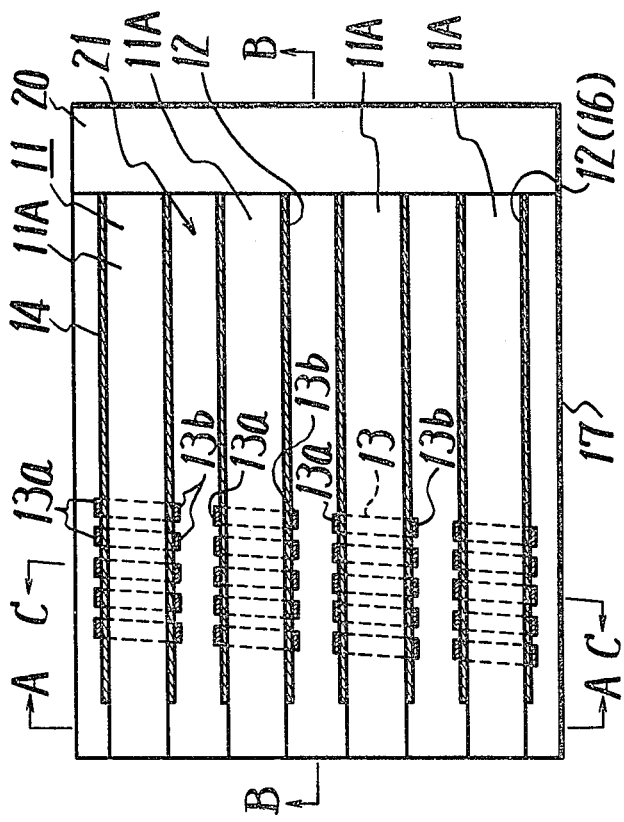
Figure 17:
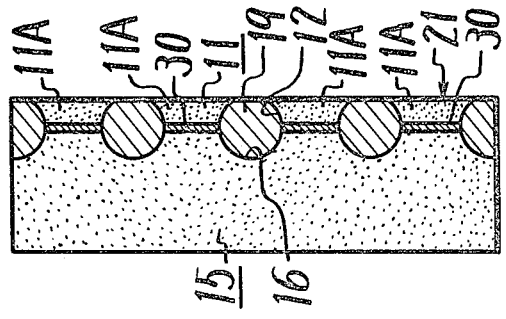
Figure 18:
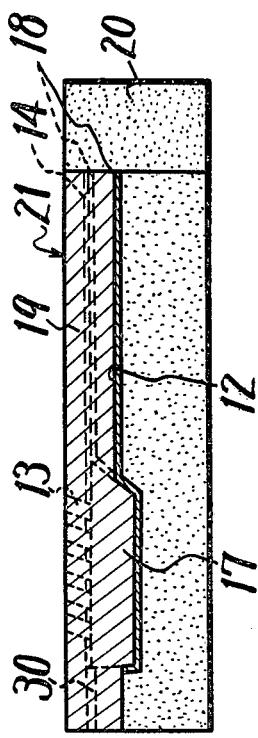

As shown in FIG. 16 which is a top view and FIGS. 17, 18 and 19 which are respectively cross-sectional views on lines A—A, B—B and C—C in FIG. 16, an auxiliary block 20 made of, for example, non-magnetic zinc Zn ferrite is bonded to the joint blocks 11 and 15 at the rear side surface thereof to serve as a terminal lead-out member, if necessary. Thereafter, the blocks 11 and 20 are subjected to surface grinding from the back surface of the block 11 to the position indicated by a twodot chain line a in FIG. 14 which intersects the groove 12 to remove parts of the first conductive layer 13 on the bottom of the groove 12. Thus, end portions 13a and 13b of the respective first conductive layers 13 coated on the inner surface of the groove 12 face a surface 21 which has been subjected to surface grinding, and the block 11 is divided into plural portions 11A by the grooves 12.

Next, as shown in FIG. 20 which is a top view and FIGS. 21, 22 and 23 which are respectively cross-sectional views on lines A—A, B—B and C—C in FIG. 20, an insulating layer 22 made of, for example, SiO$_2$ is coated by vapor deposition, sputtering or the like on the surface 21 except on the portion where the end portions 13a and 13b of the conductive layers 13 face, and at least on the surface of the portion 11A of the block 11 on which a second conductive layer will be formed as described later. For example, the insulating layer 22 may be coated on the whole surface 21 and then removed by photo-lithographic technique to present a desired pattern. Then, second conductive layers 23 are coated on the portions 11A of the block 11 which respectively bridge the insulating layer 22 and connect the end portions 13a and 13b of the band-shaped conductive layers 13. Thus, the first and second band-shaped conductive layers 13 and 23 form a winding 24 which surrounds each of the portions 11A separated by the grooves 12. In this case, at the same time that the conductive layer 23 is formed, a conductive layer 25 is formed for leading out the end of the winding 24 to a terminal end 26 on the block 20. In this case, the conductive layers 23 and 25 may be simultaneously formed in a manner such that, for example, Cu is formed on the whole surface 21 by vapor deposition or sputtering and then removed selectivily by using a photolithographic technique to obtain a desired pattern.

Then, as shown in FIG. 24 which is a top view and FIGS. 25, 26 and 27 which are respectively cross-sectional views on lines A—A, B—B and C—C in FIG. 24, a reinforcing block 27 made of non-magnetic Zn ferrite or the like is bonded to the surface 21, on which the second conductive layer 23 is formed, by inorganic adhesive such as the glass 19 which has a lower melting point than the glass charged in the grooves 12, 16, 17 or an organic resinous material 33 such as epoxy resin can be used. Thereafter, in the block 15 there are provided slits 28 by mechanical working or the like such that the slits 28 oppose the track width restricting grooves 12 and 16 at both sides of the portions 11A of the block 11 to provide portions 15A in the block 15 which are separated by the slits 28. Thereby, a multi-channel magnetic head 29 is produced in which a plurality of magnetic head elements are arranged with, each head element having core halves made of the portions 11A and 15A of the blocks 11 and 15 and a magnetic gap g with a gap length g$_L$ restricted by the non-magnetic gap spacer 30 at the front of the core halves. The track width W of the magnetic gap g at each channel of the multi-channel magnetic head 29 thus produced is restricted by a smaller groove of the track width restricting grooves 12 and 16 and the depth of the gap g is restricted by the groove 17. Further, in order to provide a desired gap depth and a desired shape of the tape contacting surface 34 at the side of the magnetic gap g it is ground, if necessary. This grinding may be carried out before or after the slits 28 are formed.

The magnetic head 29 according to the present invention has the winding 24 of each magnetic head element formed by a so-called thin film technique, so that the head 29 requires no large space for the winding to be wound. Accordingly, since the distance between adjacent channels i.e. magnetic gaps g can be selected to be small, the magnetic head 29 can be made with sufficiently high density and since the winding 24 thereof can be made with a desired number of turns, its output can be increased. Further, since the thickness of the core portion i.e. portion 11A of the magnetic block 11, on which the winding 24 is wound, can be selected to be large such as in the order of 50 to 100 μm, the reproduction efficiency of the head 29 can be made to be high.

Figure 28:
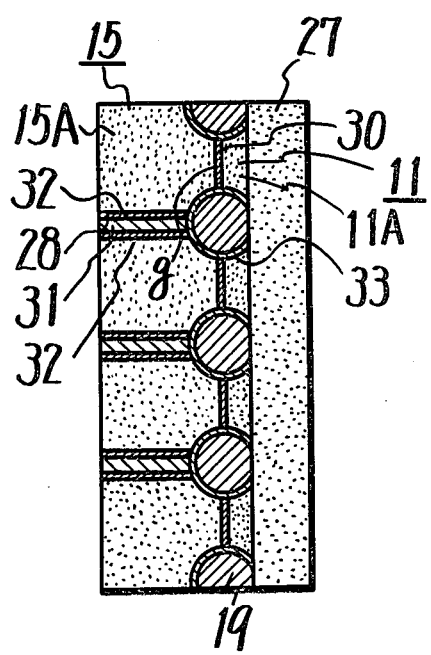
FIG. 28 is a cross-sectional view showing another example of the magnetic head according to the invention.

Also, if a magnetic shield is desired so as to reduce cross-talk with respect to each of the channels, a magnetic shield plate 31 made of permalloy or the like is inserted into each of the slits 28 as shown in FIG. 28. In this case, an insulating charging material 32 such as glass or the like is charged into each of the slits 28 to firmly hold the shield plate 31 therein and also electrically isolate the shield plate 31 from the portions 15A forming the core half of the magnetic block.

If the first conductive layer 13 is formed on the magnetic block 11 as described in connection with FIGS. 4 to 7, thereafter an insulating layer (not shown) such as SiO$_2$ or the like is coated on the groove 12 including the layer 13 and a magnetic shield layer 33 is coated on the surface in the groove 12 by sputtering permalloy or the like, and cross-talk between the magnetic head elements forming the respective magnetic gaps g can be effectively prevented by the cooperation of the magnetic shield layer 33 and the magnetic shield plate 31.

Figure 30:
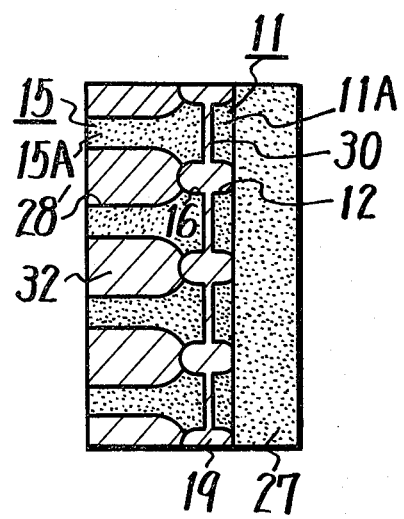
FIG. 30 is a cross-sectional view of FIG. 29.
Figure 29:
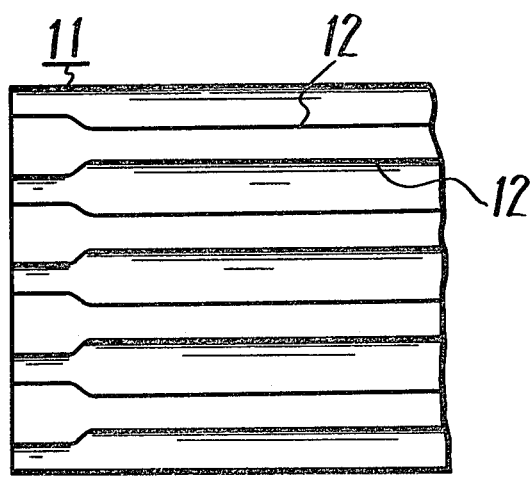
FIG. 29 is a top plan view showing an essential part of a further example of the magnetic head of the invention.

Further, as shown in FIG. 29, when the distance between the respective channels i.e. the distance between magnetic tracks on a magnetic record medium is selected to be small enough so as to increse the density of the structure as by making the width of the groove 12 narrow in the block 11 at the front end portion thereof where the magnetic gap is formed, as shown in FIG. 30, slits 28' are formed through the block 15 with the width increasing from the groove 16 to the outside which corresponds to the wide portions of the grooves 12 shown in FIG. 29. In this case, non-magnetic glass 32 is charged into the slits 28', and as described in connection with FIG. 28, magnetic shield plates and layers may be located in the respective slits 28' and the track width restricting grooves 12 and 16, respectively.

In the above example of the invention as shown and described, the multi-channel magnetic head has a plurality of magnetic gaps g in respective channels. However, it may be possible to provide a magnetic head which has a single magnetic gap by cutting the portion having the slits 28 or 28' and grooves 12, 16 i.e. blocks 11 and 15 which are bonded together at both sides of the respective magnetic gaps g or in some cases cutting up to the reinforcing block 27.

In the above example of the invention, the first and second magnetic blocks 11 and 15 are made of ferrite, but they may be made of other magnetic materials such as a complex material consisting of Sendust and ferrite or permalloy and ferrite bonded together or the like. Also, the reinforcing blocks 20 and 27 may be made of materials other than that described above.

Further, in the above example, the track width restricting grooves 12 and 16 are formed in both the blocks 11 and 15, but the grooves may be omitted in one of the blocks.

In addition, in the above example, the gap depth restricting groove 17 is provided in the second block 15 but it may be provided in the first block 11.

It will be apparent that many modifications and variations could be effected by one skilled in the art without departing from the apirits or scope of the novel concepts of the present invention, so that the spirits or scope of the invention should be determined by the appended claims only.

We claim as our invention:

1. A method of manufacturing a magnetic transducer head comprising the steps of;
    (a) preparing first and second magnetic cores, each having a first planar surface and a second planar surface opposite to said first surface;
    (b) forming first parallel grooves in one direction, leaving a predetermined width on said each first surface of said first and second cores;
    (c) forming a second groove extending perpendicular to said one direction on said first surface of at least one of said first and second cores;
    (d) forming a conductive line on said first surface and in said first parallel grooves of said first core extending along a direction substantially perpendicular to said one direction;
    (e) bonding said first and second cores to form an operating magnetic gap between said first surfaces of said first and second cores and place said conductive line to meet said second groove, and filling said first and second grooves with non-magnetic material;
    (f) removing a part of said first core from said second surface so as to dispose portions of said conductive line and to separate said conductive line in said first parallel grooves; and
    (g) forming second conductive material on said second surface of said first core to connect said portions of said first conductive line disposed on said second surface so as to form a coil around said first core.

2. A method according to claim 1, further comprising a step of cutting the bonded block of said first and second cores substantially perpendicular to said gap at a position corresponding to said first grooves.

3. A method according to claim 1, further comprising a step of forming a plurality of slits on said second core from said second surface to said first parallel grooves to separate said second core into a plurality of core elements.

* * * * *